(12) United States Patent
Baldeck et al.

(10) Patent No.: US 8,277,285 B2
(45) Date of Patent: Oct. 2, 2012

(54) METHOD OF MAINTAINING A CONSTANT GRINDING PROCESS

(75) Inventors: Brian J. Baldeck, Mumford, NY (US); Peter E. Chapin, Fairport, NY (US)

(73) Assignee: The Gleason Works, Rochester, NY (US)

( * ) Notice: Subject to any disclaimer, the term of this patent is extended or adjusted under 35 U.S.C. 154(b) by 1216 days.

(21) Appl. No.: 11/439,550

(22) Filed: May 24, 2006

(65) Prior Publication Data
US 2007/0275638 A1 Nov. 29, 2007

(51) Int. Cl.
*B24B 1/00* (2006.01)
(52) U.S. Cl. ............................................ 451/47; 451/11
(58) Field of Classification Search .................... 451/11, 451/47, 56, 57, 58
See application file for complete search history.

(56) References Cited

U.S. PATENT DOCUMENTS

| | | | | |
|---|---|---|---|---|
| 3,928,944 A | * | 12/1975 | Kedrinsky et al. | 451/123 |
| 5,175,962 A | * | 1/1993 | Pedersen | 451/5 |
| 5,761,067 A | * | 6/1998 | Alford et al. | 700/160 |
| 5,857,894 A | * | 1/1999 | Griesbach et al. | 451/5 |
| 5,857,896 A | * | 1/1999 | Stollberg | 451/47 |
| 6,217,409 B1 | * | 4/2001 | Stadtfeld et al. | 451/5 |
| 2005/0266774 A1 | * | 12/2005 | Baldeck | 451/11 |

FOREIGN PATENT DOCUMENTS

| | | |
|---|---|---|
| DE | 102004020364 A1 | 1/2006 |
| EP | 1600236 A1 | 11/2005 |
| GB | 1419745 | 12/1975 |

* cited by examiner

*Primary Examiner* — Dung Van Nguyen
(74) *Attorney, Agent, or Firm* — Robert L. McDowell

(57) ABSTRACT

Method of grinding cylindrical gears with a threaded grinding wheel wherein the amount of grinding wheel material utilized during shifting remains constant as the wheel diameter decreases, for example, due to dressing. The amount of grinding wheel shifting is adjusted as the grinding wheel diameter decreases.

13 Claims, 2 Drawing Sheets

METHOD OF MAINTAINING A CONSTANT GRINDING PROCESS

FIELD OF THE INVENTION

The present invention is directed to grinding cylindrical gears with a threaded grinding wheel wherein the amount of grinding wheel material utilized during shifting remains constant as the wheel diameter decreases, for example, due to dressing.

BACKGROUND OF THE INVENTION

In grinding cylindrical (e.g. spur or helical) gears with a threaded grinding wheel, it is customary to move or "shift" the workpiece relative to the grinding wheel in the direction of the grinding wheel axis of rotation. Shifting may occur during gear grinding (known as continuous shifting), that is, shifting may occur simultaneously with the stroke of the grinding wheel along the length of the gear teeth thus resulting in a diagonal movement between the grinding wheel and workpiece.

Shifting in the direction of the grinding wheel axis may also occur between strokes (such as between roughing and finishing grinding strokes) or after the final grinding stroke (e.g. after the finish stroke). This type of shifting, known as incremental shifting, is usually intended to position the workpiece at another location on the grinding wheel such as for finish grinding, or to reposition the grinding wheel from a finish grind position of one workpiece to a start position for the next workpiece. Incremental shifting may take place between any or all strokes in either direction of the grinding wheel axis.

Shifting distributes wear evenly along the length of a grinding wheel and brings fresh portions of the grinding wheel into contact with a workpiece which makes it possible to remove a maximum amount of metal in a short period of time without wheel loading or gear burning. Wheel loading is understood to be a condition where metal particles adhere to a grinding wheel thereby filling up pores in the grinding wheel which causes an increased load or power draw on the grinding wheel. Gear burning is understood to be a condition where enough heat is generated during the grinding process to cause the metal of the gear tooth flanks to temper. Severe burning can be seen visually, however in most instances, a special detection process must be used to determine if a gear has been burned. Wheel loading can also cause gear burning.

In shifting from a beginning location to an end location along the axis of the grinding wheel, a corresponding amount of grinding thread surface area is utilized. The amount of thread surface area is dependent upon the amount of continuous shift (CS), the diameter (or radius) of the grinding wheel and the lead angle ($\lambda$) of the grinding thread.

However, as a grinding wheel is used, the grinding thread becomes worn and, therefore, the grinding wheel must be periodically dressed to restore the grinding thread to its desired form. With each dressing, the diameter of the grinding wheel is reduced. As the diameter of a grinding wheel is reduced, the amount of thread surface area utilized in shifting is likewise reduced. Thus, the grinding process is not constant and the reduced amount of thread surface area per shift increases the likelihood of wheel loading and/or gear burning, which can affect the quality of the gear being produced.

SUMMARY OF THE INVENTION

The present invention is directed to a method of providing a constant grinding process by adjusting the amount of grinding wheel shifting as the diameter of a grinding wheel decreases.

DETAILED DESCRIPTION OF THE PREFERRED EMBODIMENT

The present invention will be discussed with reference to preferred embodiments which are intended to represent the invention by way of example only.

Figure 2:
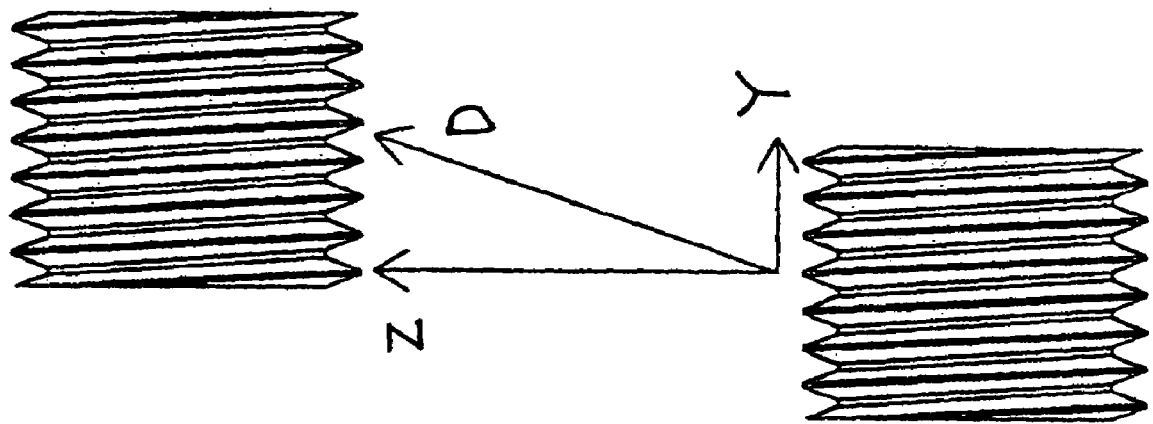
FIG. 2 shows diagonal motion resulting from the motions of FIG. 1.
Figure 1:
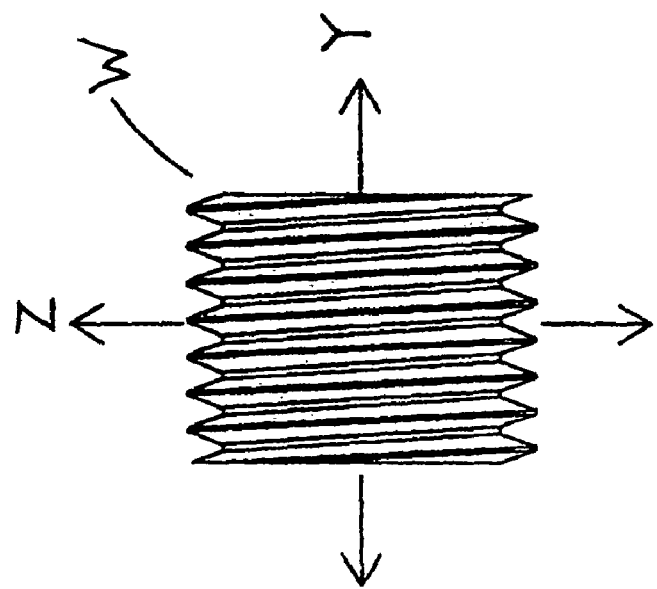
FIG. 1 illustrates two motion components of a grinding process.

FIG. 1 illustrates two motion components of a grinding process for cylindrical (e.g. spur or helical) gears. The first component, Z, represents the grinding wheel feed motion whereby the grinding wheel, W, is moved (i.e. stroked) along the length of a gear tooth (not shown). The second component, Y, represents shifting in the direction of the grinding wheel axis of rotation. The combination of these motions results in a diagonal feed motion, D, (FIG. 2) across the grinding wheel. It should be understood that the above motions are relative motions between the grinding wheel and a workpiece and are not limited to motion of the grinding wheel only but may be realized by motion of a workpiece or by a combination of motions of both the grinding wheel and workpiece.

As mentioned above, shifting distributes wear evenly along the length of a grinding wheel and brings fresh portions of the grinding wheel into contact with a workpiece which makes it possible to remove a maximum amount of metal in a short period of time without wheel loading or gear burning. However, as the diameter of a grinding wheel decreases, due to dressing, for example, the amount of thread surface area utilized in shifting also decreases. Hence, the grinding process is not constant and the quality of the gears being ground is lessened as the thread surface area decreases.

The inventors have discovered that the grinding process can be maintained as a constant process, and as such the quality of gears can be consistently maintained, by adjusting the amount of shifting, preferably at least continuous shifting, as the diameter (or radius) of the grinding wheel is reduced. In this manner, the amount of thread surface area per shift is maintained at a constant amount throughout the life of the grinding wheel.

When a grinding wheel is first used, an initial shift amount is determined. This can be done in many ways. For example, the initial continuous shift amount may be determined as a percentage of the module (Pitch Diameter/Number of Teeth) of the workpiece, for example, 20% of the module. Thus, for a module 2.5 gear, the initial continuous shift amount is 0.50 mm. As for the initial amount of incremental shifting, an amount (mm) equal to the module (e.g. 2.5 mm) may be utilized and an initial amount (mm) of incremental back-shift (discussed below) may be chosen as, for example, 70% (e.g. 1.75 mm) of the module. Of course, initial amounts of any type of shifting may also be determined by mathematical relationships or the experience and/or preference of a particular manufacturer or machine operator. A particular initial shift amount (continuous or incremental) or a particular manner for determining the initial shift amount is not preferred nor required for carrying out the present invention.

Figure 3:
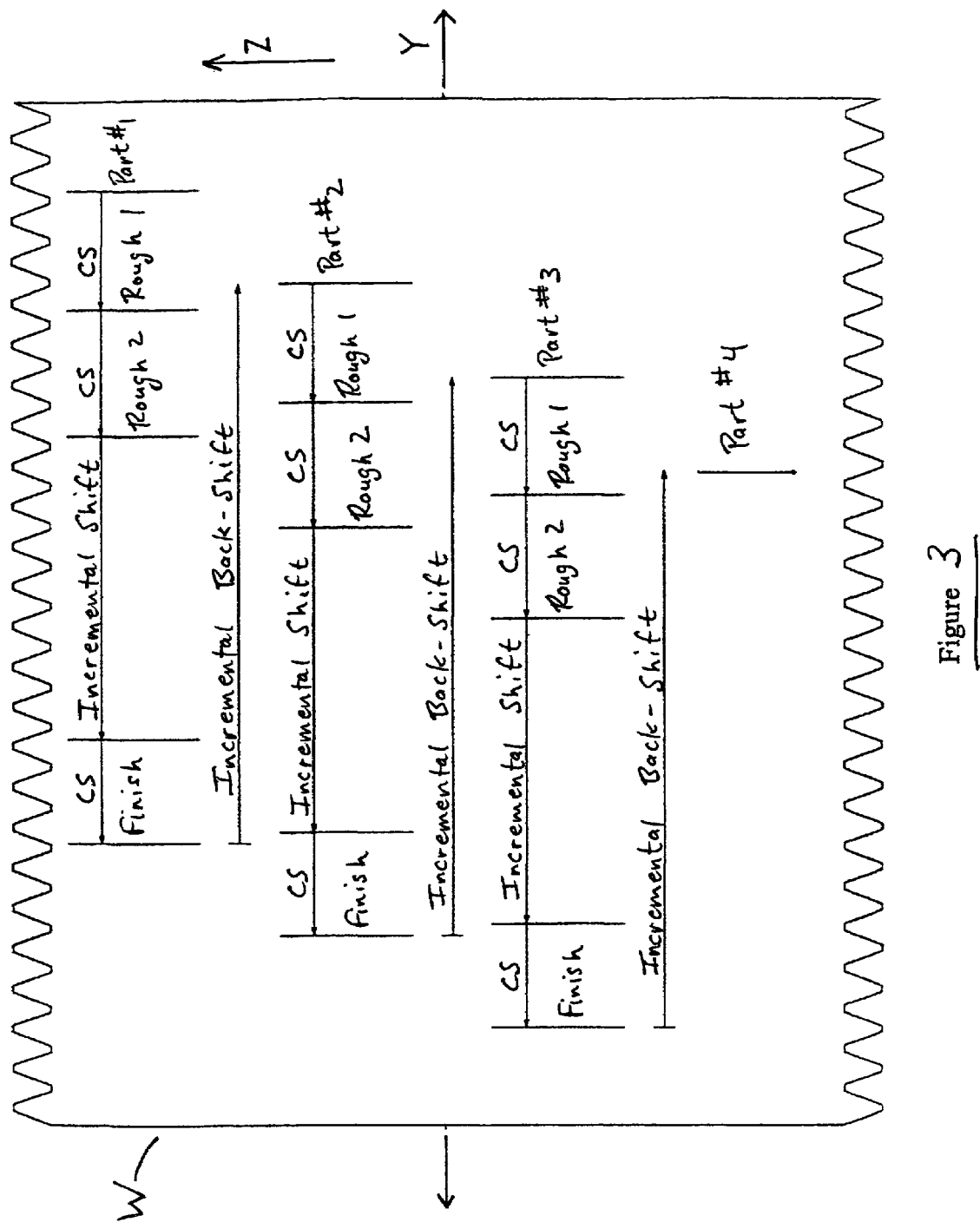
FIG. 3 illustrates an example of a shifting sequence that occurs during workpiece grinding.

An example of a typical grinding and shifting sequence is illustrated in FIG. 3. A first workpiece, Part #1, is brought into contact with a grinding wheel at an initial desired location on the grinding wheel and grinding commences with a first rough grinding pass (Rough 1) followed by a second rough grinding pass (Rough 2). During each of the rough grinding passes, the grinding wheel is continuously shifted (CS) with respect to the workpiece. After the second rough grinding pass, an incremental shift (IS) occurs (with no contact between the grinding wheel and the part) which repositions the workpiece to another location (i.e. a fresh or lesser used location) along the length of the grinding wheel where a finish grinding pass (Finish) occurs. During the finish grinding pass, the grinding wheel is again continuously shifted (CS) with respect to the workpiece. Upon completion of the grinding process for Part #1, an Incremental Back-Shift (IBS) takes place (no contact with the grinding wheel) for establishing the initial grinding position for the next workpiece, in this example, Part #2. The workholding equipment and/or the grinding wheel are repositioned such that Part #2 will be brought into contact with the grinding wheel at the location defined by the amount of Incremental Back-Shift. Since back-shift occurs in a direction opposite to continuous and incremental shifting, its direction and amount of shift are usually represented by a negative (−) sign convention.

The above sequence is repeated for each new workpiece until the grinding wheel is dressed and grinding can again commence starting at the location of Part #1, or another starting location, whichever is desired. It should be understood that although four parts are shown in FIG. 3, the number of parts shown is for illustrative purposes only and is not intended to be an indication of the number of parts that are machined between grinding wheel dressings. Furthermore, although the parts (#1-#4) are illustrated at different Z-direction positions on the grinding wheel of FIG. 3, this is again for illustrative purposes and is not indicative of varied Z-axis starting positions being required by the present invention.

The present invention comprises maintaining a constant grinding process wherein the amount of shifting adjusted to an increased amount as the diameter (or radius) of the grinding wheel decreases. Preferably, the relationship between shifting (continuous and/or incremental) and grinding wheel diameter is generally expressed as follows:

$$S_A = \frac{d_1}{d_c}(S_1) \tag{1}$$

Where: $S_A$=newly adjusted shift amount
$S_1$=initial shift amount
$d_1$=initial grinding wheel diameter
$d_C$=current (newly dressed) grinding wheel diameter Of course, it is clearly evident that the above relationship can be equivalently expressed as a function of the changing grinding wheel radius. In other words:

$$S_A = \frac{r_1}{r_c}(S_1) \tag{2}$$

Where: $S_A$=newly adjusted shift amount
$S_1$=initial shift amount
$r_1$=initial grinding wheel radius
$r_C$=current (newly dressed) grinding wheel radius As an example, for a gear having a module of 2.95, the following initial shift amounts were determined utilizing the percentage relationships discussed above:
Initial continuous shift amount (20% of module)=0.590 mm
Initial incremental shift amount (equal to module)=2.950 mm
Initial incremental back-shift amount (70% of module)=− 2.065 mm The initial grinding wheel diameter ($d_1$)=220 mm.

For this example, a current (newly dressed) grinding wheel diameter ($d_C$) of 190 mm is selected. Utilizing the relationship of Equation (2), it can be seen that when the diameter of the grinding wheel is at 190 mm, the amount of shifting is adjusted or revised as follows:

Continuous Shift (CS):

$$CS_A = \frac{d_1}{d_c}(CS_1) \tag{3}$$

$$CS_A = 220/190 \ (0.590 \text{ mm}) = 0.683 \text{ mm}$$

Incremental Shift (IS):

$$IS_A = \frac{d_1}{d_c}(IS_1) \tag{4}$$

$$IS_A = 220/190 \ (2.950 \text{ mm}) = 3.416 \text{ mm}$$

Incremental Back-Shift (IBS):

$$IBS_A = \frac{d_1}{d_c}(IBS_1) \tag{5}$$

$$IBS_A = 220/190 \ (-2.065 \text{ mm}) = -2.391 \text{ mm}$$

As the diameter of the grinding wheel decreases, the amount of shifting increases. In this manner, the thread surface area associated with each shift amount will remain constant as the diameter of the grinding wheel changes. Thus, the grinding process will remain constant throughout the entire life of a grinding wheel and as such, the gear quality will be consistent throughout the life of the grinding wheel. While maintaining a constant amount of thread surface area during shifting has been discussed, it follows that the amount of grinding thread volume will also be constantly maintained as long as the dressing depth is held constant.

It is preferred that after each dressing of the grinding wheel, the adjusted shift amount for one or more of continuous shifting, incremental shifting and back-shifting, most preferably for at least continuous shifting, is determined based on the grinding wheel diameter that exists after dressing (i.e. the "current, newly dressed" grinding wheel diameter). In this manner, the amount of grinding wheel material utilized in the respective shifting will remain constant and the quality of the ground part will be consistent. However, while preferred, adjusting one or more of the shift amounts after each dressing is not required. Shift amount adjustments may be determined at every other dressing or every third dressing, for example.

While the above examples are expressed based on the relationship of the current newly dressed grinding wheel diameter, $d_C$, the initial grinding wheel diameter, $d_1$, and the initial shifting amount, $S_1$, the present invention may also be expressed based on the relationship of the current (newly dressed) grinding wheel diameter, $d_C$, and the immediately previous grinding wheel diameter, $d_{C-1}$, and the immediately previous shifting amount, $S_{A-1}$, as follows:

$$S_A \frac{d_{c-1}}{d_c}(S_{A-1}) \quad (6)$$

Where: $S_A$=newly adjusted shift amount
$S_{A-1}$=immediately previous shift amount
$d_{C-1}$=immediately previous grinding wheel diameter
$d_C$=current (newly dressed) grinding wheel diameter It is further noted that although the present method has been discussed with reference to a cylindrical grinding wheel, the present method is equally applicable to grinding processes conducted on any type of threaded grinding wheel (including those known as hollow crowned (concave) and barrel-crowned (convex) grinding wheels), where shifting of the workpiece is appropriate. The present invention is also applicable to grinding wheels having multiple starts.

Although the inventive method has been discussed with respect to adjusting the amount of shifting as the grinding wheel diameter decreases, as would mostly likely occur due to periodic dressing, the method may also be applied in an opposite manner. For instance, if in the above example, the presently used grinding wheel ($d_1$=220 mm) is dressed down to its minimum workable diameter, for example, 160 mm, the adjusted continuous shift amount, $CS_A$, at the newly dressed diameter of 160 mm will be 0.811 mm (see Equation (3) above). Utilizing the information at this minimum diameter (or at any other selected diameter), an amount of initial shifting for a subsequent new grinding wheel (e.g. diameter=240 mm) for the same gear may be determined. In this case (for continuous shifting):

$$CS_1 = \frac{d_c}{d_1}(CS_c) \quad (7)$$

Where: $CS_1$=initial shift amount of the new grinding wheel
$CS_C$=current shift amount of the present grinding wheel
$d_1$=diameter of new grinding wheel
$d_C$=current diameter of present grinding wheel Thus, based on the above parameters, the initial shift amount for a new grinding wheel having a diameter of 240 mm will be:

$$CS_1 = 160/240(0.811 \text{ mm}) = 0.541 \text{ mm}$$

Of course, the relationships expressed in Equation (7) may also be applied for determining the initial amounts of incremental shifting (IS) and incremental back-shifting (IBS) for a subsequent grinding wheel.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of grinding cylindrical gears with a threaded grinding wheel, said grinding including shifting the gear relative to the grinding wheel during at least a portion of said grinding, said method comprising:
varying the amount of shifting as a function of the diameter of said grinding wheel during a period of use of said grinding wheel to maintain a constant grinding method, wherein during said period of use, the diameter of said grinding wheel decreases from a first dimension and the amount of shifting increases from a first amount.

2. The method of claim 1 wherein said shifting comprises continuous shifting.

3. The method of claim 1 wherein said grinding includes at least one of rough grinding and finish grinding and wherein the gear is continuously shifted with respect to the grinding wheel during said at least one of rough grinding and finish grinding.

4. The method of claim 1 comprising rough grinding and finish grinding and wherein said rough grinding and said finish grinding are carried out at non-adjacent locations along the length of the grinding wheel, the distance between said non-adjacent locations being defined by an increment of length, said gear being shifted relative to the grinding wheel along said increment with said gear being out of contact with said grinding wheel during the shifting along said increment.

5. The method of claim 1 comprising finish grinding a first gear followed by rough grinding a second gear wherein said finish grinding and said rough grinding are carried out at non-adjacent locations along the length of the grinding wheel, the distance between said non-adjacent locations being defined by an increment of length, said grinding wheel being shifted relative to workholding equipment for the first or second gear along said increment with said gear being out of contact with said grinding wheel during the shifting along said increment.

6. The method of claim 1 wherein maintaining a constant grinding method comprises maintaining a constant amount of grinding wheel thread surface area during said shifting.

7. The method of claim 1 wherein maintaining a constant grinding method comprises maintaining a constant amount of grinding wheel thread volume during said shifting.

8. A method of maintaining a constant grinding process wherein said grinding process comprises grinding cylindrical gears with a threaded grinding wheel including shifting the gear relative to the grinding wheel during at least a portion of said grinding, said constant grinding process extending over a period of use of said threaded grinding wheel wherein said period of use includes at least one dressing operation resulting in a decrease of the diameter of said grinding wheel, said method comprising:
varying the amount of shifting from a first amount prior to dressing to a second increased amount subsequent to dressing, the increased amount of shifting being defined by a function of the decreased diameter of said grinding wheel during said period of use of said grinding wheel, whereby a constant grinding process is maintained by the increased amount of shifting.

9. The method of claim 8 wherein maintaining a constant grinding method comprises maintaining a constant amount of grinding wheel thread surface area during said shifting.

10. The method of claim 8 wherein maintaining a constant grinding method comprises maintaining a constant amount of grinding wheel thread volume during said shifting.

11. The method of claim 8 wherein the increased amount of shifting is determined based on the diameter of the grinding wheel immediately before dressing and the decreased diameter of the grinding wheel immediately after said dressing.

12. The method of claim 8 wherein the increased amount of shifting is determined based on the diameter of the grinding wheel prior to any dressing and the decreased diameter of the grinding wheel immediately after the most recent dressing.

13. A method of grinding cylindrical gears with a threaded grinding wheel, said grinding including shifting the gear relative to the grinding wheel during at least a portion of said grinding, said method comprising:

varying the amount of shifting as a function of decreasing diameter of said grinding wheel during a period of use of said grinding wheel which includes at least one dressing, wherein during said period of use, as the diameter of said grinding wheel decreases from a first dimension the amount of shifting increases from a first amount, whereby a constant grinding method is maintained.

* * * * *